United States Patent
Collados Asensio et al.

(10) Patent No.: US 7,583,650 B2
(45) Date of Patent: Sep. 1, 2009

(54) FREQUENCY MULTIPLEXED ARCHITECTURE

(75) Inventors: Manel Collados Asensio, Eindhoven (NL); Gerben Willem De Jong, Eindhoven (NL)

(73) Assignee: NXP B.V., Eindhoven (NL)

( * ) Notice: Subject to any disclaimer, the term of this patent is extended or adjusted under 35 U.S.C. 154(b) by 597 days.

(21) Appl. No.: 10/558,726

(22) PCT Filed: May 26, 2004

(86) PCT No.: PCT/IB2004/050776
§ 371 (c)(1),
(2), (4) Date: Nov. 30, 2005

(87) PCT Pub. No.: WO2004/110886
PCT Pub. Date: Dec. 16, 2004

(65) Prior Publication Data
US 2007/0042783 A1     Feb. 22, 2007

(30) Foreign Application Priority Data
Jun. 5, 2003     (EP) .................... 03101641

(51) Int. Cl.
*H04W 20/67*     (2006.01)

(52) U.S. Cl. .............. 370/339; 370/334; 370/341; 375/130; 455/552.1; 455/73

(58) Field of Classification Search .............. 455/273, 455/277.1–277.2, 101–103, 188.1, 189.1, 455/552.1, 132, 73; 370/343, 341, 330, 203, 370/339; 375/130, 134, 341, 267, 316, 347
See application file for complete search history.

(56) References Cited

U.S. PATENT DOCUMENTS

| | | | |
|---|---|---|---|
| 5,796,772 A * | 8/1998 | Smith et al. .............. 455/552.1 |
| 6,215,988 B1 * | 4/2001 | Matero .................... 455/188.1 |
| 6,314,147 B1 | 11/2001 | Liang et al. |
| 6,574,459 B1 * | 6/2003 | Kaminski et al. ........... 455/272 |
| 7,263,146 B2 * | 8/2007 | van Rooyen ................ 375/347 |
| 2004/0142723 A1 * | 7/2004 | Shippee .................... 455/552.1 |

* cited by examiner

*Primary Examiner*—Kamran Afshar

(57) ABSTRACT

A receiver (10) is arranged to simultaneously receive at least a first (S1) radio frequency signal having a first frequency band (1) and a second radio frequency signal (S3) having a second frequency band (3) that is at least partly overlapping the first frequency band (1). The receiver has frequency down-conversion means (32,33) for frequency down converting the at least first (S1) and second radio frequency signals (S3) to at least a first (S2) and a second (S4) lower frequency signal and multiplexing means (34) for sequentially multiplexing the at least first (S2) and second lower frequency signals (S4) into a frequency multiplexed signal (S5).

9 Claims, 3 Drawing Sheets

FREQUENCY MULTIPLEXED ARCHITECTURE

The invention relates to a receiver arranged to simultaneously receive at least a first radio frequency signal having a first frequency band and a second radio frequency signal having a second frequency band that is at least partly overlapping the first frequency band.

The invention also relates to a transmitter, to a transceiver, to a method of receiving and to a method of simultaneously transmitting.

The present invention can be used in telecommunication systems such as Multiple Input Multiple Output or MIMO systems, where a transmitter comprises a first number of parallel transmitting branches arranged to simultaneously transmit data in parallel, and where the receiver comprises a second number of parallel receiving branches arranged to simultaneously receive data in parallel. The first number of transmitting branches can be equal to, or differ from, the second number of receiving branches. By using these parallel branches, enhancement of data rate and/or channel capacity can be achieved. MIMO systems are used in for example cellular radio systems such as GSM or UMTS, wireless radio systems such as DECT and in wireless networks such as LANs, WANs or PANs.

A prior art telecommunication system is known from U.S. Pat. No. 6,314,147 which discloses a receiver comprising several parallel (analogue) receiving branches that are coupled to inputs of a digital receiver.

It is an object of the present invention to provide an improved receiver for use in for example MIMO systems. To this end, the receiver is arranged to simultaneously receive at least a first radio frequency signal having a first frequency band and a second radio frequency signal having a second frequency band that is at least partly overlapping the first frequency band, the receiver comprising:

frequency down-converting means for frequency down-converting the at least first and second radio frequency signals to at least a first and a second lower frequency signal;

multiplexing means for sequentially multiplexing the at least first and second lower frequency signals into a frequency multiplexed signal;

The invention is based upon the insight that noise sources can introduce correlated noise into the parallel receiving branches that is added to the received signals. For example, when the invention is realized in silicon and/or the receiving branches share a common synthesizer for processing the received signals, or when there is a common noise source somewhere on the silicon. Correlated noise can lower the data rate and/or the channel capacity of the receiver. The invention is further based upon the insight that by frequency multiplexing the received at least first and second radio frequency signals into a single frequency multiplexed signal, noise sources no longer can introduce correlated noise into the received signals, because, due to the sequential frequency multiplexing the frequency bands of the first and second lower frequency signals are separated in frequency. That is, each signal comprised in the frequency multiplexed signal is affected with different—uncorrelated—spectral components of the noise source.

In an embodiment according to the present invention, the receiver further comprises an analogue to digital converter for digitizing the frequency multiplexed signal. By multiplexing the information contained in the received radio frequency signals into a single frequency multiplexed signal, only a single analogue to digital converter (ADC) is required to digitize the received signals in contrast to, a single ADC per received signal.

In an embodiment according to the present invention, the receiver further comprises demultiplexing means for demultiplexing the digitized frequency multiplexed signal into at least a first and a second signal which is advantageous in that it enables a convenient processing of the digitized information.

In another embodiment according to the present invention a transmitter is arranged to simultaneously transmit at least a first radio frequency signal having a first frequency band and a second radio frequency signal having a second frequency band that is at least partly overlapping the first frequency band, the transmitter comprising:

signal multiplexing means for sequentially multiplexing at least a first and a second signal into a frequency multiplexed signal;

demultiplexing means for demultiplexing the frequency multiplexed signal into at least a first and a second lower frequency signal; and frequency up-converting means for frequency up-converting the first lower frequency signal into the first radio frequency signal and for frequency up-converting the second lower frequency signal into the second radio frequency signal. This embodiment has the advantage that by sequentially multiplexing the first and second signals into a single frequency multiplexed signal, noise sources can no longer introduce correlated noise into signals.

In an embodiment according to the present invention, the multiplexing means comprises a digital to analogue converter (DAC) for converting the sequentially multiplexed first and second digital signals to a frequency multiplexed signal. This embodiment has the advantage that only a single DAC is required for converting the digital signals to a frequency multiplexed signal.

Embodiments of a transceiver according to the present invention, of a receiving method according to the present invention and a transmission method according to the present invention correspond with the embodiments of the transmitter and receiver according to the present invention.

These and other aspects of the invention will be apparent from and elucidated with reference to the embodiments described hereinafter FIG. 1 shows the frequency bands of two radio frequency signals according to the present invention.

Figure 1:
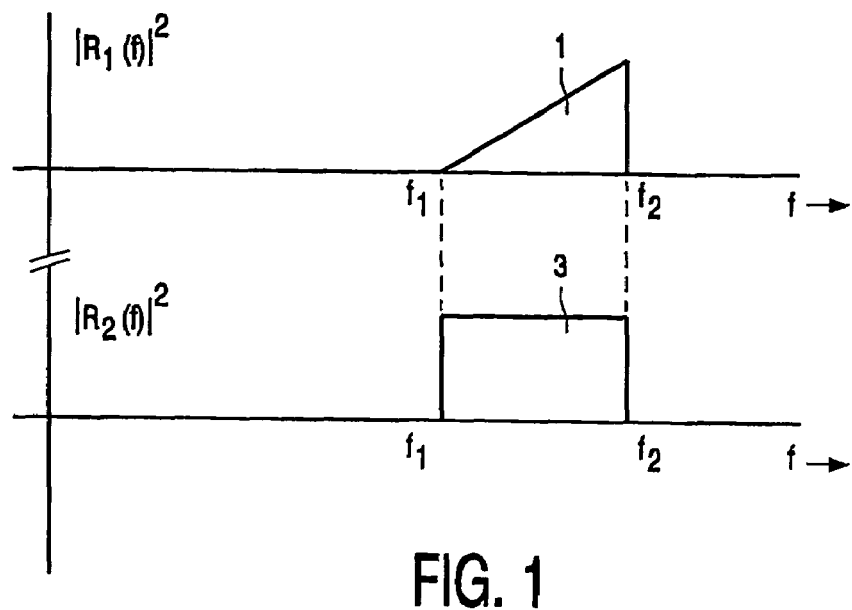

FIG. 1 shows the frequency bands 1 and 3 of two radio frequency signals that are having, by means example, equal bandwidths (f2-f1) that are fully overlapping i.e. they occupy the same frequency range. As an example, single sideband signals have been assumed. Alternatively, the frequency bands 1 and 3 may also partly overlap.

Figure 2:
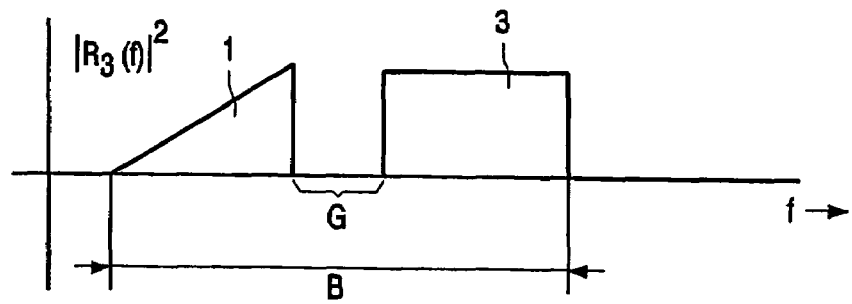
FIG. 2 shows a frequency multiplexed signal comprising the frequency bands of two sequentially multiplexed lower frequency signals.

FIG. 2 shows a frequency multiplexed signal comprising frequency bands 1 and 3. By means of example the frequency bands 1 and 3 are separated by means of guard band G. The frequency multiplexed signal occupies a total bandwidth B.

Figure 3:
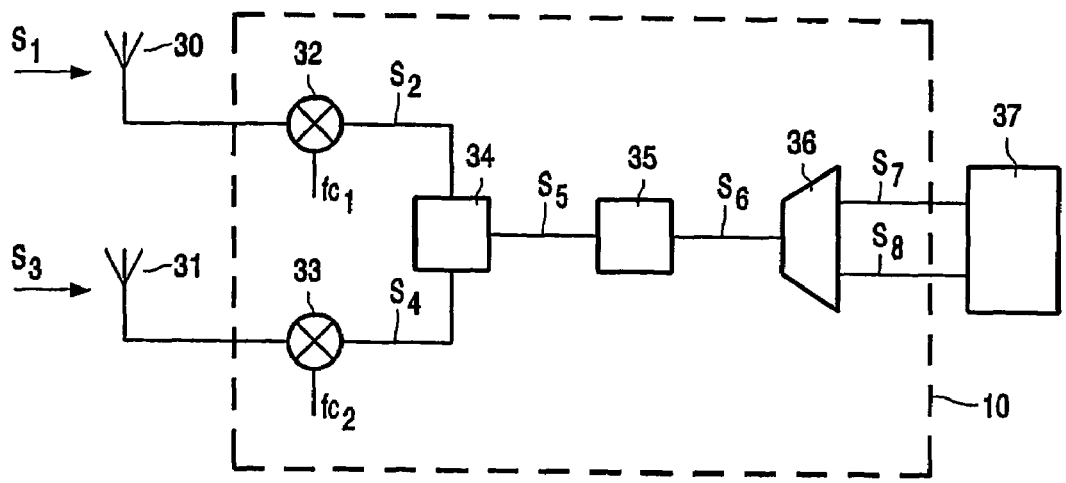
FIG. 3 shows a receiver according to the present invention.

FIG. 3 shows a receiver 10 according to the present invention having, by means of example, two antennas 30 and 31 for receiving two radio frequency signals S1 and S2. Receiver 10 comprises mixers 32 and 33 for frequency down-converting the received radio frequency signals S1 and S3 into lower frequency signals S2 and S3. By means of multiplexer 34, signals S2 and S4 are sequentially multiplexed into frequency multiplexed signal S5. Multiplexer 34 could e.g. comprise a conventional adding element for adding the signals S2 and S4 together. Analogue to digital converter 35 is used to digitize the frequency multiplexed signal S5. Herewith, S6 comprises the digitized spectra of signals S2 and S4. In order to satisfy Shannon's law, the working speed of the analogue to digital converter 35 should be at least be twice the frequency band B of the frequency multiplexed signal S5. By means of demultiplexing unit 36, digital signals S7, S8 can be recovered so that they can be used for further processing in processing means 37. The information comprised in S7 and S8 corresponds to the information comprised in S1 and S3. Although, in contrast to S1 and S3, signals S7 and S8 are digital signals. The embodiment as shown in FIG. 3 has the advantage that noise sources cannot introduce correlated noise into the sequentially multiplexed signal S5. The embodiment has the further advantage that only a single digital to analogue converter 37 is required to digitize all received signals.

Figure 4:
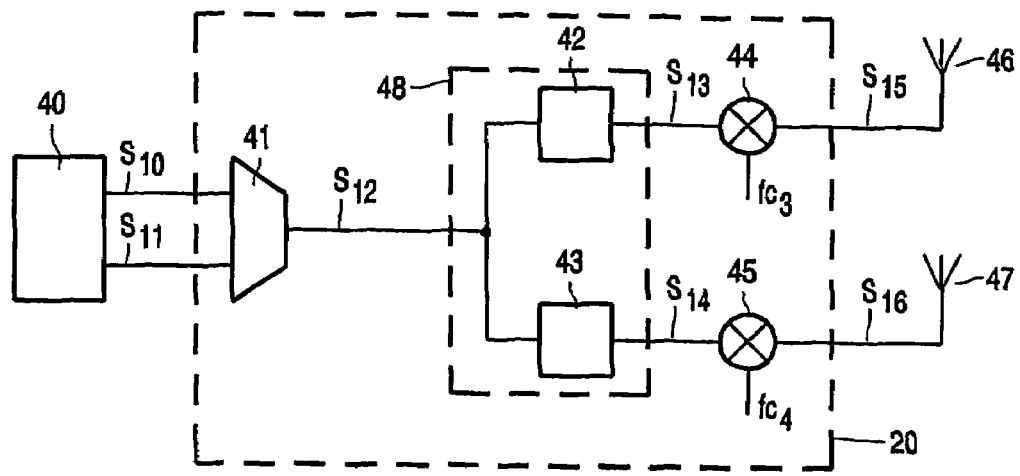
FIG. 4 shows a transmitter according to the present invention.
Figure 4A:
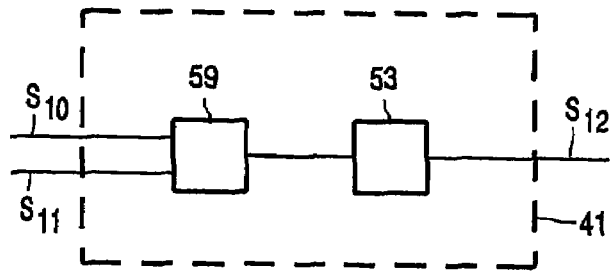
FIG. 4a shows a multiplexer according to the present invention.
Figure 4B:
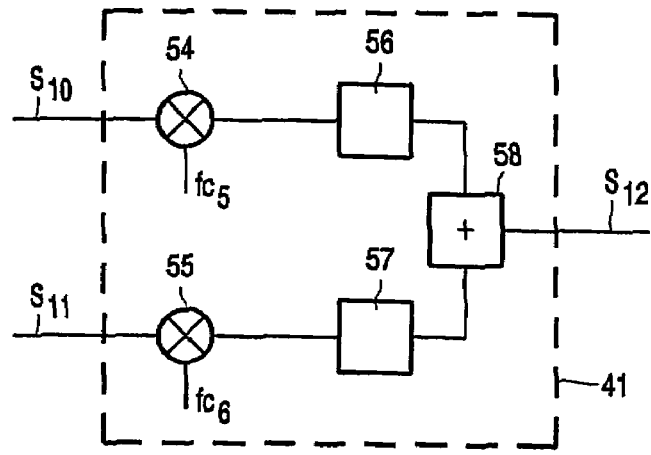
FIG. 4b shows a further multiplexer according to the present invention.

FIG. 4 shows a transmitter 20 according to the present invention. Shown are two signals S10 and S11 that have been processed by processing means 40. By means of multiplexing means 41, signals S10 and S11 are frequency multiplexed into signal S12. In principle signals S10 and S11 can be digital or analogue. In case of digital signals S10 or S11, the multiplexing means 41 can be constructed as shown in FIG. 4a, wherein the multiplexing means comprises a multiplexer 59 for sequentially multiplexing the digital signals S10 and S11 into signal S12d. By means of digital to analogue converter (53) signal S12d is subsequently converted into the analogue frequency multiplexed signal S12. In case S10 and S11 are analogue signals, the multiplexer could be constructed as shown in FIG. 4b where multipliers 54 and 55 are used to shift the frequency of signals S10 and S11. Filters 56 and 57 e.g. bandpass filters are used to remove the unwanted spectral components after multiplication. By means of adder 58, the signals S10 and S11 are added together which results in the frequency multiplexed signal S12. Therefore, S12 comprises two signals S13, S14 that are a representation of the original signals S10 and S11. By means of demultiplexing unit 48 these two signals S13, S14 can be recovered e.g. by using bandpass filters 42 and 43. By means of multipliers 44 and 45 signals S13 and S14 are being frequency up-converted to signals S15 and S16, respectively. Signals S15 and S16 are subsequently being transmitted into the air via antennas 46 and 47. This embodiment has the advantage that a noise source cannot introduce correlated noise into the signals S10 and S11 once they are frequency multiplexed into signal S12. In addition the invention has the further advantage only a single digital to analogue converter 53 is required to convert digital signals S10 and S11 into a single frequency multiplexed signal S12.

Figure 5:
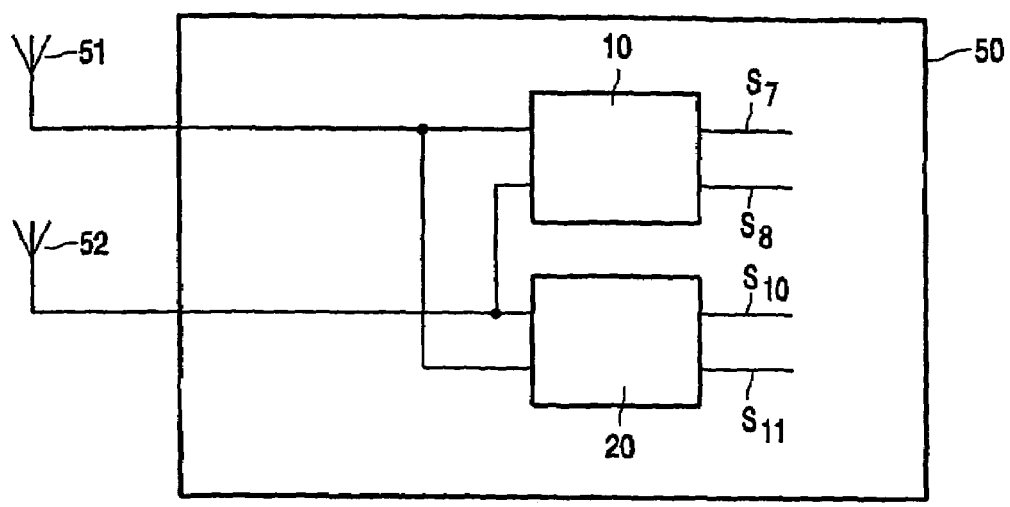
FIG. 5 shows a transceiver according to the present invention

FIG. 5, shows a transceiver 50 according to the present invention. The transceiver comprises antennas 51 and 52 for receiving and transmitting data. The transceiver comprises a receiver 10 and a transmitter 20 which are coupled to processing means (not shown here) for processing signals S7, S8 and S10 and S11.

Figure 6:
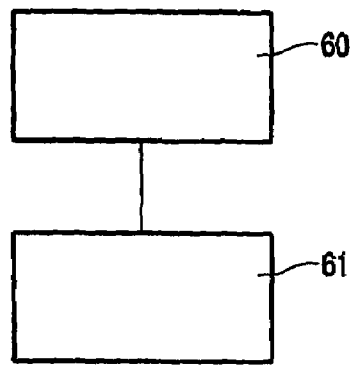
FIG. 6 shows a flow chart of a method for receiving radio frequency signals according to the present invention.

FIG. 6 shows a flow chart of a method for receiving radio frequency signals according to the present invention. In the first step 60, the at least first and second radio frequency signals S1 and S3 are frequency down-converted into at least a first lower frequency S2 signal and a second lower frequency signal S3. In the second step 61, signals S2 and S3 are sequentially multiplexed into frequency multiplexed signal S5.

Figure 7:
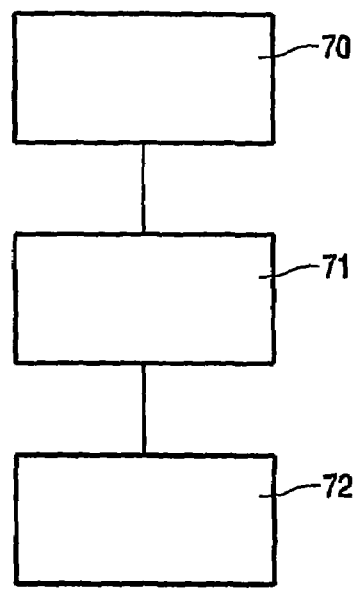
FIG. 7 shows a flow chart of a method for transmitting radio frequency signals according to the present invention.

FIG. 7 shows a flow chart of a method for transmitting radio frequency signals according to the present invention. In the first step 70 the at least first and second signals S10 and S11 are sequentially multiplexed into a frequency multiplexed signal S12. Then in step 71, signal S12 is demultiplexed back into signals S13 and S14. Finally in step 72, signals S13 and S14 are frequency up-converted into the first radio frequency signal S15 and into the second radio frequency signal S16.

It is to be noted that the above-mentioned embodiments illustrate rather than limit the invention, and that those skilled in the art will be able to design many alternative embodiments without departing from the scope of the appended claims. The embodiments can be realized in either the analogue or digital domain using analogue and digital components. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. Transceiver comprising:
   a receiver that is arranged to simultaneously receive at least a first radio frequency signal having a first frequency band and a second radio frequency signal having a second frequency band that is at least partly overlapping the first frequency band, the receiver comprising:
   signal conversion means for frequency down-converting the at least first and second radio frequency signals to at least a first and a second lower frequency signal; and
   multiplexing means for sequentially multiplexing the at least first and second lower frequency signals into a frequency multiplexed signal; and
   a transmitter that is arranged to simultaneously transmit at least a third radio frequency signal having a third frequency band and a fourth radio frequency signal having a fourth frequency band that is at least partly overlapping the third frequency band, the transmitter comprising:
   signal multiplexing means for sequentially multiplexing at least a third and a second signal into a frequency multiplexed signal;
   demultiplexing means for demultiplexing the frequency multiplexed signal into at least a third and a fourth lower frequency signal; and
   frequency up-converting means for frequency up-converting the third lower frequency signal into the third radio frequency signal and for frequency up-converting the fourth lower frequency signal into the fourth radio frequency signal.

2. A transceiver according to claim 1, wherein the receiver further comprises an analogue to digital converter for digitizing the frequency multiplexed signal.

3. A transceiver according to claim 2, wherein the receiver further comprises demultiplexing means for demultiplexing the digitized frequency multiplexed signal into at least a first and a second signal.

4. A transceiver according to claim 1, wherein the at least third and fourth signals are digital signals.

5. A transceiver according to claim 4, wherein the multiplexing means comprises a digital to analogue converter for converting the sequentially multiplexed third and fourth digital signals to a frequency multiplexed signal.

6. Method for operating a transceiver, the method comprising:
   receiving at least a first radio frequency signal having a first frequency band and a second radio frequency signal having a second frequency band that is at least partly overlapping the first frequency band receiving further comprises:
      frequency down-converting the at least first and second radio frequency signals into at least a first lower frequency signal and a second lower frequency signal; and
      sequentially multiplexing the at least first and second lower frequency signals into a frequency multiplexed signal; and
   transmitting at least a third radio frequency signal having a third frequency band and a fourth radio frequency signal having a fourth frequency band that is at least partly overlapping the third frequency band, wherein transmitting further comprises:
      sequentially multiplexing the at least third and a fourth signals into a frequency multiplexed signal;
      demultiplexing the frequency multiplexed signal into at least a third and a fourth lower frequency signal; and
      frequency up-converting the third lower frequency signal into the third radio frequency signal and the fourth lower frequency signal into the fourth radio frequency signal.

7. The method of claim 6, further comprising digitizing the frequency multiplexed signal.

8. The method of claim 7, further comprising demultiplexing the digitized frequency multiplexed signal into at least a first signal and a second signal.

9. The method of claim 6, further comprising converting the sequentially multiplexed third and fourth digital signals to a frequency multiplexed signal.

* * * * *